United States Patent
Kienzl

(10) Patent No.: US 8,963,835 B2
(45) Date of Patent: Feb. 24, 2015

(54) METHOD FOR DISPLAYING AN ITEM ON A DISPLAY UNIT

(76) Inventor: Thomas Kienzl, Graz (AT)

( * ) Notice: Subject to any disclaimer, the term of this patent is extended or adjusted under 35 U.S.C. 154(b) by 0 days.

(21) Appl. No.: 13/989,308

(22) PCT Filed: Nov. 23, 2011

(86) PCT No.: PCT/AT2011/000475
§ 371 (c)(1),
(2), (4) Date: May 23, 2013

(87) PCT Pub. No.: WO2012/068607
PCT Pub. Date: May 31, 2012

(65) Prior Publication Data
US 2013/0241899 A1    Sep. 19, 2013

Related U.S. Application Data

(60) Provisional application No. 61/416,988, filed on Nov. 24, 2010.

(30) Foreign Application Priority Data

Nov. 24, 2010 (AT) .................................. A 1956/2010

(51) Int. Cl.
*G09G 5/00* (2006.01)
*G06T 13/00* (2011.01)
(Continued)

(52) U.S. Cl.
CPC ............. *G06T 13/00* (2013.01); *G06F 3/011* (2013.01); *G06F 3/0418* (2013.01); *G06F 3/042* (2013.01); *G06T 7/004* (2013.01); *G06T 2207/30204* (2013.01)
USPC ............................. 345/156; 345/157; 345/169

(58) Field of Classification Search
CPC ..... G06F 3/0425; G06F 3/0354; G06F 3/048; G06F 3/04842
USPC ................................................ 345/156–169
See application file for complete search history.

(56) References Cited

U.S. PATENT DOCUMENTS

7,574,045 B2 * 8/2009 Simon et al. .................. 382/181
(Continued)

FOREIGN PATENT DOCUMENTS

EP    1 193 646    4/2002
(Continued)

OTHER PUBLICATIONS

International Search Report issued by the European Patent Office in International Application PCT/AT2011/000475 on Mar. 27, 2012.

*Primary Examiner* — Jennifer Nguyen
(74) *Attorney, Agent, or Firm* — Henry N. Feiereisen LLC

(57) ABSTRACT

By a method for displaying an item on a display unit (5), the following steps will be suggested: —arranging a first plan (22) of a first virtual space in a navigation area (21) of a navigation plane, —imaging the navigation area (21) by means of an optical registration system (3) of a computer-supported interface system (1), —determining the position of a calibration arrangement of the first plan (22), and calibrating the plan coordinate system of the image of the first plan (22) in the computer-supported interface system (1) on the basis of the calibration arrangement, —assigning the first virtual space to the navigation area (21) in consideration of the plan coordinate system, —determining the coordinates, including position and orientation, of a manually guidable object (23) in the first plane (22) by means of the computer-supported interface system (1), the manually guidable object (23) having at least one optical marking, —assigning the coordinates of the manually guidable object (23) in the first plan (22) to coordinates of a virtual observer in the first virtual space, and —displaying the field of vision of the observer in the virtual space on the display unit (5).

12 Claims, 1 Drawing Sheet

(51) Int. Cl.
*G06F 3/01* (2006.01)
*G06F 3/041* (2006.01)
*G06F 3/042* (2006.01)
*G06T 7/00* (2006.01)

(56) References Cited

U.S. PATENT DOCUMENTS 8,004,571 B2 * 8/2011 Yamashita ............... 348/211.12

2002/0084974 A1 * 7/2002 Ohshima et al. ............... 345/156

FOREIGN PATENT DOCUMENTS

| EP | 1 335 317 | 8/2003 |
| EP | 2 157 545 | 2/2010 |
| WO | WO 02/35909 | 5/2002 |
| WO | WO 2006/089323 | 8/2006 |
| WO | WO 2010/062303 | 6/2010 |

* cited by examiner

METHOD FOR DISPLAYING AN ITEM ON A DISPLAY UNIT

CROSS-REFERENCES TO RELATED APPLICATIONS

This application is the U.S. National Stage of International Application No. PCT/AT2011/000475, filed Nov. 23, 2011, which designated the United States and has been published as International Publication No. WO 2012/068607 and which claims the priority of Austrian Patent Application, Serial No. A 1956/2010, filed Nov. 24, 2010, pursuant to 35 U.S.C. 119(a)-(d).

This application claims the benefit of prior filed U.S. provisional Application No. 61/416,988, filed Nov. 24, 2010, pursuant to 35 U.S.C. 119(e).

BACKGROUND OF THE INVENTION

The invention relates to a method for displaying an item on a display unit by means of a computer-supported interface system.

Methods for displaying an item on a display unit by means of a computer-supported interface system are known. An autonomous object is moved around a model of the item, and an image of the actual item or an image of the computer-animated item is displayed on a display screen or a projection screen, the perspective effect of the display and the viewing direction of the item being determined by the position of the object to the model of the item.

SUMMARY OF THE INVENTION

The object of the invention is to improve a method for displaying an item by means of a computer-supported interface system of the above-mentioned type in such a manner that the possible uses are expanded.

According to one aspect of the invention, the object is achieved by a method for displaying an item on a display unit, having the following steps: arranging a first plan of a first virtual space in a navigation area of a navigation plane, imaging the navigation area by means of an optical registration system of a computer-supported interface system, determining the position of a calibration arrangement of the first plan, and calibrating the plan coordinate system of the image of the first plan in the computer-supported interface system on the basis of the calibration arrangement, assigning the first virtual space to the navigation area in consideration of the plan coordinate system, determining the coordinates, including position and orientation, of a manually guidable object in the first plane by means of the computer-supported interface system, the manually guidable object having at least one optical marking, assigning the coordinates of the manually guidable object in the first plan to coordinates of a virtual observer in the first virtual space, and displaying the field of vision of the observer in the virtual space on the display unit.

The advantage results in accordance with the invention that the current location of the first plan can be ascertained easily, rapidly, and reliably by the calibration, whereby a good display of the item can be ensured even in the event of displacement of the plan or parts of the computer-supported interface system.

According to another aspect of the invention, the object is achieved by a method for displaying an object on a display unit, having the following steps: imaging a navigation area by means of an optical registration system of a computer-supported interface system, assigning a first virtual space to the navigation area, determining the coordinates, including position and orientation, of a manually guidable object in the navigation area by means of the computer-supported interface system, the manually guidable object having at least one optical marking, assigning the coordinates of the manually guidable object in the navigation area to coordinates of a virtual observer in the first virtual space, and displaying the field of vision of the observer in the virtual space on the display unit assigning a further virtual space, instead of the first virtual space, to the navigation area after the determination of the manually guidable object in at least one first changeover position and subsequently using the further virtual space in the event of a movement of the manually guidable object.

The functionality achievable using the manually guidable object can be substantially increased by without the manually guidable object having to be changed. The manually guidable object can be designed particularly simply. The manually guidable object can be replaced easily and rapidly if necessary. This is advantageous in particular in the case of presentations in the public sphere, measures against losing the manually guidable object not being necessary and the manually guidable object also being able to be designed as a cost-effective present.

The subclaims relate to further advantageous embodiments of the invention. Reference is hereby expressly made to the wording of the claims, whereby the claims are incorporated by reference into the description at this point and are considered to be reproduced verbatim.

BRIEF DESCRIPTION OF THE DRAWING

The invention is described in greater detail hereafter with reference to the appended drawings, which solely illustrate preferred embodiments as examples. In the figures.

DETAILED DESCRIPTION OF PREFERRED EMBODIMENTS

Figure 1:
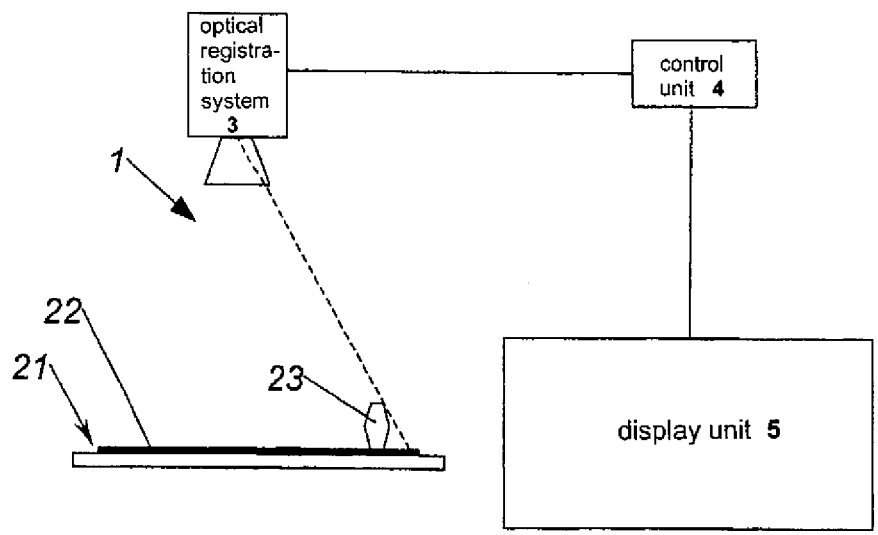
FIG. 1 shows a first embodiment of a computer-supported interface system.
Figure 2:
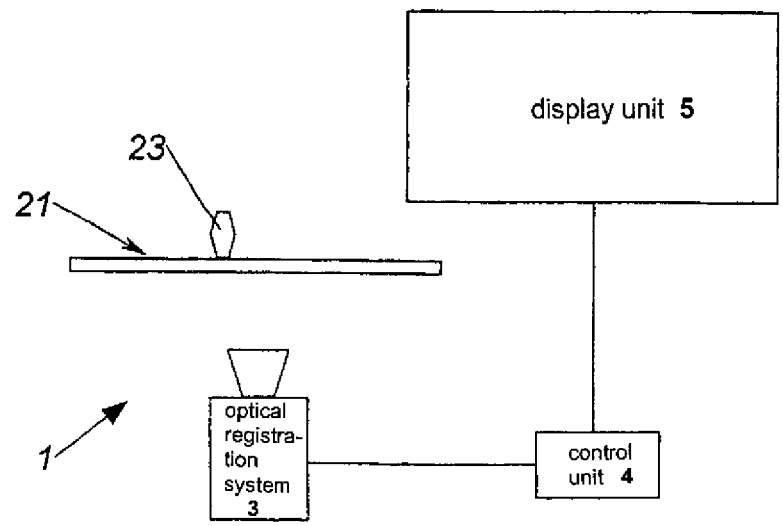
FIG. 2 shows a further embodiment of a computer-supported interface system.

FIGS. 1 to 2 show embodiments of a computer-supported interface system 1.

The computer-supported interface system 1 comprises an optical registration system 3, which can particularly be implemented as a camera. Other optical systems can also be provided instead of a camera. In FIGS. 1 and 2, the optical registration system 3 schematically has one camera, multiple cameras or optical sensors also being able to be provided. The optical registration system 3 is situated so that it can register at least one area of a navigation plane. The navigation plane has a navigation area 21, which is registered as a whole by the optical registration system. It is not necessary for the navigation area 21 to be the maximum possible area which is registered by the optical registration system 3. In particular to avoid edge fuzziness, the navigation area 21 can be smaller than the maximum possible area which is registered by the optical registration system 3. Furthermore, the geometrical shape of the navigation area 21 can be predefined.

A control unit 4, using which the data registered by the optical registration system 3 can be received and further processed, is connected to the optical registration system 3. A display unit 5 is connected to the output of the control unit 4. Data output by the control unit 5 may be visualized using the display unit.

The display unit 5 may be any type of display unit, in particular a display screen or a projection device, preferably a video projector, being suitable.

A manually guidable object 23 is situated in the navigation area 21, which can be moved, in particular displaced and rotated, by an operator. The manually guidable object 23 has an optical marking, which allows the control unit to determine the coordinates of the manually guidable object 23 easily and reliably. The coordinates comprise at least both position and orientation of the manually guidable object 23.

The manually guidable object 23 is preferably implemented as an autonomous object, no terminals being required for the manually guidable object 23. This allows a particularly simple and cost-effective embodiment of the manually guidable object 23.

Two embodiments appear to be particularly suitable for the arrangement of the optical registration system 3, which are schematically shown in FIGS. 1 and 2. In FIG. 1, the manually guidable object 23 and the optical registration system 3 are located on the same side of the navigation plane. The navigation plane can be any essentially flat or curved surface. If the manually guidable object 23 is held by an operator, the optical marking of the manually guidable object 23 can be concealed and can only be imaged incompletely or not at all by the optical registration system 3.

The danger of concealing the optical marking of the manually guidable object 23 can be reduced if the optical registration system 3 registers the navigation area 21 from at least two viewing angles.

In the case of the calibration, it can be provided that the last result is reused if the calibration arrangement is concealed in such a way that a calibration cannot be performed.

It can be provided that a first plan 22 is arranged on the navigation plane in the navigation area 21. Particular provisions for the use in the method according to the invention are also not necessary in the case of the first plan 22. It must only be ensured that the optical registration system 3 can image the first plan 22.

In the embodiment shown in FIG. 2, the manually guidable object 23 and the optical registration system 3 are located on different sides of the navigation plane. If the manually guidable object 23 is held by an operator, it will nonetheless be registered by the optical registration system 3, since the hand of the operator does not come to rest between the optical registration system 3 and the manually guidable object 23.

In order to allow this arrangement, it is necessary for the navigation plane to be transparent or translucent to the employed wavelength of the optical system 3 at least in the navigation area 21. If a first plan 22 is arranged on the navigation plane, it must also be at least regionally transparent and/or translucent.

During the display of an item on a display unit 5, the navigation area 21 is imaged by means of the optical registration system 3 of the computer-supported interface system 1, a first virtual space is assigned to the navigation area 21, the coordinates, including position and orientation of the manually guidable object 23 in the navigation area 21, are determined by means of the computer-supported interface system 1, the manually guidable object 23 having at least one optical marking, the coordinates of the manually guidable object 23 in the navigation area 21 being assigned to coordinates of a virtual observer in the first virtual space, and the field of vision of the observer in the virtual space being displayed on the display unit 5.

It can be provided that a first plan 22 of the first virtual space is arranged in the navigation area 21. In this manner, a simple aid for the movement of the manually guidable object 23 can be provided for the operator in the navigation area 21 by the first plan 22. It can be easily recognized through the first plan 22 how the manually guidable object 23 must be moved in order to achieve a desired display on the display unit 5.

The first plan 22 can be recorded on paper or cardboard. Furthermore, the first plan 22 can be applied to a transparency. However, all carriers on which the first plan 22 can be displayed are usable.

It can also be provided that the first plan 22 is projected on the navigation plane by means of a projection device. In still further embodiments, it can also be provided that the navigation plane itself is implemented as a display screen and the first plan 22 is displayed on the navigation plane.

It has been shown that the computer-supported interface system 1 is often subject to shocks or the like and the imaging of the first plan 22 by the optical registration system 3 is not fixed in location. It can be provided that the position of a calibration arrangement of the first plan 22 is determined, and a calibration of the plan coordinate system of the imaging of the first plan 22 is performed in the computer-supported interface system on the basis of the calibration arrangement. It can thus be ensured in a simple manner that the coordinates of the manually guidable object 23 are determined in relation to the first plan 22 and these are used for the display of the field of vision of the observer in the virtual space on the display unit 5.

For example, if the optical registration system 3 is moved and the plan 22 and the manually guidable object 23 are left unmoved, in known systems, a change of the coordinates of the manually guidable object 23 is determined and the display on the display unit 5 is changed accordingly. Through the calibration, the current location of the first plan 22 and the coordinates of the manually guidable object 23 in relation to the first plan 22 are determined and accordingly, in the above-mentioned example, the display on the display unit 5 is not changed, whereby a substantial quality improvement of the display is achieved. It has proven to be favorable if the calibration arrangement comprises at least three pre-definable position signs. The precise location and the scale of the first plan 22 can thus be determined in a particularly simple manner, whereby relative movements of the optical registration system 3 perpendicular to the first plan 22 can also be taken into consideration easily.

A further improvement of the method can be achieved if an identification arrangement of the first plan 22 is detected before the assignment of the first virtual space to the navigation area 21 using the optical registration system 3, a first file provided on a data carrier is assigned to the first virtual space on the basis of the identification arrangement, and data of the first virtual space is subsequently accepted from the first file.

Manifold first plans 22 and associated files can be provided in a simple manner in this case. For example, in the case of larger construction projects, manifold individual plans may be provided, which each represent a first plan 22. A change between two of the first plans 22 can be performed merely by exchanging the first plans 22. The computer-supported interface system 1 follows this change because of the determination of the corresponding identification arrangement.

Following the calibration of the plan coordinate system of the image of the first plan 22 in the computer-supported interface system 1, the movement of at least a part of the calibration arrangement can be monitored and the plan coordinate system of the image of the first plan 22 in the computer-supported interface system 1 can be adapted in accordance with the movement of the calibration arrangement.

A majority of the parameters required for the calibration are already known in the case of this adaptation, so that it is sufficient if only a part of the calibration arrangement is registered by the optical registration system 3.

For example, if one or more of the position signs of the calibration arrangement are concealed or they are no longer in the area registered by the optical registration system 3, the adaptation of the plan coordinate system can nonetheless be performed. In the case of a suitable implementation of the position signs, for example, as a cross, the registration of one position sign is sufficient to adapt the plan coordinate system in accordance with the movement of the first plan 22.

The optical marking of the manually guidable object 23 can be arranged spaced apart from the navigation plane. An optical offset can therefore occur between the actual position of the manually guidable object 23 on the navigation plane and the position apparent to the optical registration system 3. In FIG. 1, the edge of the optical marking arranged on the upper side of the manually guidable object 23 is not recognized at its actual position, but rather at the position of incidence of the corresponding vision beam on the navigation plane. This is illustrated in FIG. 1 by the dashed line.

It has proven to be favorable if the optical offset is taken into consideration during the determination of the position of the manually guidable object 23 and the actual position of the manually guidable object 23 is determined.

It can be provided that the position of the optical registration system 3 in relation to the first plan 22 is determined. The optical offset can be taken into consideration easily using these data. The position of the optical registration system in relation to the first plan 22 can be ascertained from the appearance of the calibration arrangement, for example.

It can be provided that a further virtual space is assigned to the navigation area 21, instead of the first virtual space, after the determination of the manually guidable object 23 in at least one changeover position. The further virtual space is subsequently used during a movement of the manually guidable object 23.

Through the further virtual space, additional functionalities can easily be provided to the operator, which can be retrieved by means of the manually guidable object 23. It is thus not necessary to actuate further control units, such as a keyboard or the like, in addition to the manually guidable object 23, whereby the operation of the computer-supported interface system 1 can be made particularly simple.

A movement of the manually guidable object 23 can have different effects in the further virtual space in comparison to the first virtual space. For example, the display of a configuration item can be provided in the further virtual space. For example, it can be provided that the viewing direction is always directed toward the configuration item and a rotation of the manually guidable object 23 causes a change of the zoom factor of the display of the configuration item.

It has proven to be favorable if the assignment of the further virtual space is first performed when the manually guidable object 23 has been determined for a pre-definable duration in the first changeover position. This can prevent a changeover from already occurring when the manually guidable object 23 is unintentionally moved into the changeover position. In order to be able to return from the further virtual space back into the first virtual space, it can be provided that after the determination of the manually guidable object 23 in at least one further changeover position, the navigation plane is again assigned to the first virtual space and subsequently the first virtual space is used.

It is preferably provided that the changeover positions are also displayed in the virtual spaces. An operator is thus made capable of changing between virtual spaces without having to look away from the display unit 5.

An interaction can also be performed by means of further input technologies, which can particularly relate to augmented reality systems, RFID, barcodes which can be optically registered, OR codes, touchscreens, tablet computers, gesture control, a mouse, or a keyboard. These input technologies can be integrated in the manually guidable object 23 or can be additionally provided.

For example, it can be provided that the changeover between virtual spaces is performed by means of further input technologies.

It is obvious for a person skilled in the art that further embodiments can be implemented, which only have a part of the described features. A combination of features of various described embodiments can particularly be provided.

What is claimed is:

1. A method for displaying an object on a display unit, comprising:
   imaging a navigation area by an optical registration system of a computer-supported interface system;
   assigning a first virtual space to the navigation area;
   determining coordinates, including position and orientation, of a manually guidable object in the navigation area by the computer-supported interface system, the manually guidable object having at least one optical marking;
   assigning the coordinates of the manually guidable object in the navigation area to coordinates of a virtual observer in the first virtual space;
   displaying a field of vision of the observer in the first virtual space on the display unit,
   assigning a further virtual space, instead of the first virtual space, to the navigation area after determination of the manually guidable object in at least one first changeover position and subsequently using the further virtual space in the event of a movement of the manually guidable object; and
   performing assignment of another virtual space only when the manually guidable object has been determined for a pre-definable duration in the changeover position.

2. The method of claim 1, wherein, after determination of the manually guidable object in at least one further changeover position of the navigation plane, the first virtual space is assigned again and the first virtual space is subsequently used.

3. The method of claim 1, further comprising considering an optical offset between an actual position of the manually guidable object on the navigation area and a position apparent to the optical registration system during determination of the position of the manually guidable object.

4. The method of claim 1, further comprising:
   arranging a first plan of the first virtual space in the navigation area of a navigation plane;
   determining a position of a calibration arrangement of the first plan;
   calibrating plan coordinate system of an image of the first plan in the computer-supported interface system on the basis of the calibration arrangement; and
   assigning the first virtual space to the navigation area in consideration of the plan coordinate system.

5. The method of claim 4, wherein, following calibration of the plan coordinate system of the image of the first plan in the computer-supported interface system, monitoring a movement of at least a part of the calibration arrangement, and adapting the plan coordinate system of the image of the first plan in the computer-supported interface system in accordance with the movement of the calibration arrangement.

6. The method of claim 4, further comprising determining the position of the optical registration system in relation to the first plan.

7. A method for displaying an object on a display unit, comprising:
- imaging a navigation area by an optical registration system of a computer-supported interface system;
- assigning a first virtual space to the navigation area;
- determining coordinates, including position and orientation, of a manually guidable object in the navigation area by the computer-supported interface system, the manually guidable object having at least one optical marking;
- assigning the coordinates of the manually guidable object in the navigation area to coordinates of a virtual observer in the first virtual space;
- displaying a field of vision of the observer in the first virtual space on the display unit,
- assigning a further virtual space, instead of the first virtual space, to the navigation area after determination of the manually guidable object in at least one first changeover position and subsequently using the further virtual space in the event of a movement of the manually guidable object;
- performing assignment of another virtual space only when the manually guidable object has been determined for a pre-definable duration in the changeover position,
- arranging a first plan of the first virtual space in the navigation area of a navigation plane;
- determining a position of a calibration arrangement of the first plan;
- calibrating plan coordinate system of an image of the first plan in the computer-supported interface system on the basis of the calibration arrangement; and
- assigning the first virtual space to the navigation area in consideration of the plan coordinate system,
- wherein the calibration arrangement comprising at least three pre-definable position signs is used.

8. The method of claim 7, wherein, after determination of the manually guidable object in at least one further changeover position of the navigation plane, the first virtual space is assigned again and the first virtual space is subsequently used.

9. The method of claim 7, further comprising considering an optical offset between an actual position of the manually guidable object on the navigation area and a position apparent to the optical registration system during determination of the position of the manually guidable object.

10. A method for displaying an object on a display unit, comprising:
- imaging a navigation area by an optical registration system of a computer-supported interface system;
- assigning a first virtual space to the navigation area;
- determining coordinates, including position and orientation, of a manually guidable object in the navigation area by the computer-supported interface system, the manually guidable object having at least one optical marking;
- assigning the coordinates of the manually guidable object in the navigation area to coordinates of a virtual observer in the first virtual space;
- displaying a field of vision of the observer in the first virtual space on the display unit,
- assigning a further virtual space, instead of the first virtual space, to the navigation area after determination of the manually guidable object in at least one first changeover position and subsequently using the further virtual space in the event of a movement of the manually guidable object;
- performing assignment of another virtual space only when the manually guidable object has been determined for a pre-definable duration in the changeover position,
- arranging a first plan of the first virtual space in the navigation area of a navigation plane;
- determining a position of a calibration arrangement of the first plan;
- calibrating plan coordinate system of an image of the first plan in the computer-supported interface system on the basis of the calibration arrangement; and
- assigning the first virtual space to the navigation area in consideration of the plan coordinate system,
- wherein, before assignment of the first virtual space to the navigation area, detecting an identification arrangement of the first plan using the optical registration system, assigning a first file provided on a data carrier to the first virtual space on the basis of the identification arrangement, and subsequently accepting data of the first virtual space from the first file.

11. The method of claim 10, wherein, after determination of the manually guidable object in at least one further changeover position of the navigation plane, the first virtual space is assigned again and the first virtual space is subsequently used.

12. The method of claim 10, further comprising considering an optical offset between an actual position of the manually guidable object on the navigation area and a position apparent to the optical registration system during determination of the position of the manually guidable object.

* * * * *